US007555627B2

(12) United States Patent
Mashiko et al.

(10) Patent No.: US 7,555,627 B2
(45) Date of Patent: Jun. 30, 2009

(54) INPUT-OUTPUT CONTROL APPARATUS, INPUT-OUTPUT CONTROL METHOD, PROCESS CONTROL APPARATUS AND PROCESS CONTROL METHOD

(75) Inventors: Naoya Mashiko, Hitachiota (JP); Takashi Umehara, Hitachi (JP); Masamitsu Kobayashi, Hitachi (JP); Hiromichi Endoh, Hitachi (JP); Akihiro Onozuka, Hitachi (JP); Akira Bando, Hitachi (JP); Shin Kokura, Hitachi (JP); Hisao Nagayama, Hitachi (JP); Masakazu Ishikawa, Hitachi (JP); Satoru Funaki, Hitachi (JP); Masahiro Shiraishi, Hitachi (JP)

(73) Assignees: Hitachi, Ltd., Tokyo (JP); Hitachi Information & Control Solutions, Ltd., Ibaraki (JP)

( * ) Notice: Subject to any disclaimer, the term of this patent is extended or adjusted under 35 U.S.C. 154(b) by 171 days.

(21) Appl. No.: 11/477,468

(22) Filed: Jun. 30, 2006

(65) Prior Publication Data
US 2007/0239916 A1    Oct. 11, 2007

(30) Foreign Application Priority Data
Jun. 30, 2005    (JP)    ............................. 2005-190876

(51) Int. Cl.
*G06F 12/00* (2006.01)
*G06F 13/00* (2006.01)
*G06F 13/28* (2006.01)

(52) U.S. Cl. .................... 711/173; 711/163; 711/154
(58) Field of Classification Search .................. None
See application file for complete search history.

(56) References Cited

U.S. PATENT DOCUMENTS 5,031,146 A * 7/1991 Umina et al. ........... 365/189.17
5,428,685 A * 6/1995 Kadooka et al. ............ 713/190
6,076,149 A * 6/2000 Usami et al. ................ 711/163

FOREIGN PATENT DOCUMENTS

| CN | 1615473 | 5/2005 |
|---|---|---|
| JP | 6-75861 | 3/1994 |
| JP | 2004-145605 | 5/2004 |
| WO | WO 03/060696 | 7/2003 |

* cited by examiner

*Primary Examiner*—Kevin Verbrugge
*Assistant Examiner*—Eric S Cardwell
(74) *Attorney, Agent, or Firm*—Antonelli, Terry, Stout & Kraus, LLP.

(57) ABSTRACT

Input-output devices are prevented from conducting false output due to faulty operation by providing an input-output control apparatus configured to store input-output values to be used by a processor to conduct arithmetic operation in a mode having a relatively high safety requirement, in a first storage area, store input-output values to be used by the processor to conduct arithmetic operation in a mode having a relatively low safety requirement, in a second storage area, and restrict copying to the first storage area, copying from the first storage area, copying to the second storage area, or copying from the second storage area according to the mode concerning the safety requirement.

13 Claims, 3 Drawing Sheets

FIG.3

| MEMORY MAP (TAKING SLOT AS UNIT) | | OPERATION MODE | | OPERATION OUTLINE |
|---|---|---|---|---|
| | | ORDINARY MODE | SAFETY MODE | |
| ORDINARY I/O AREA [51]* | ORDINARY OUTPUT | 1 (OUTPUT PRESET VALUE) | 2 (ACCESS IS IMPOSSIBLE, ALARM REPORT [362]*) | OUTPUT IS POSSIBLE ONLY IN ORDINARY TASK |
| | ORDINARY INPUT | 1 (READ INPUT VALUE) | 2 (ACCESS IS IMPOSSIBLE, ALARM REPORT [362]*) | INPUT IS POSSIBLE ONLY IN ORDINARY TASK |
| | SAFETY OUTPUT | 2 (OUTPUT IS IMPOSSIBLE, ALARM REPORT [38]*) | 2 (ACCESS IS IMPOSSIBLE, ALARM REPORT [362]*) | SAFETY OUTPUT IS PROHIBITED IN ORDINARY TASK. ALARM IS REPORTED TO PROCESSOR |
| | SAFETY INPUT | 3 (READING OR ALARM REPORT [38]* IS POSSIBLE ACCORDING TO SETTING) | 2 (ACCESS IS IMPOSSIBLE, ALARM REPORT [362]*) | ONLY REFERENCE CAN BE MADE POSSIBLE ACCORDING TO SETTING |
| SAFETY I/O AREA [52]* | ORDINARY OUTPUT | 2 (ACCESS IS IMPOSSIBLE, ALARM REPORT [362]*) | 2 (OUTPUT IS IMPOSSIBLE, ALARM REPORT [38]*) | ORDINARY OUTPUT IS PROHIBITED IN SAFETY TASK. ALARM IS REPORTED TO PROCESSOR |
| | ORDINARY INPUT | 2 (ACCESS IS IMPOSSIBLE, ALARM REPORT [362]*) | 3 (READING OR ALARM REPORT [38]* IS POSSIBLE ACCORDING TO SETTING) | ONLY REFERENCE CAN BE MADE POSSIBLE ACCORDING TO SETTING |
| | SAFETY OUTPUT | 2 (ACCESS IS IMPOSSIBLE, ALARM REPORT [362]*) | 1 (OUTPUT PRESET VALUE) | OUTPUT IS POSSIBLE ONLY ON SAFETY TASK |
| | SAFETY INPUT | 2 (ACCESS IS IMPOSSIBLE, ALARM REPORT [362]*) | 1 (READ INPUT VALUE) | INPUT IS POSSIBLE ONLY ON SAFETY TASK |

* NUMERAL IN [ ] CORRESPONDS TO NUMERAL IN FIG.2.

INPUT-OUTPUT CONTROL APPARATUS, INPUT-OUTPUT CONTROL METHOD, PROCESS CONTROL APPARATUS AND PROCESS CONTROL METHOD

BACKGROUND OF THE INVENTION

The present invention relates to an input-output control apparatus, an input-output control method, a process control apparatus and a process control method. In particular, the present invention relates to a control apparatus aiming at highly reliable control suitable for preventing a plurality of input-output devices from inputting or outputting output values falsely. More specifically, the present invention relates to a control apparatus that has a plurality of input-output areas and that prevents false inputs and outputs in cooperation with software.

In a control computer applied to a control apparatus in a device, it is necessary to provide suitable protection from both aspects of hardware and software so as to prevent a failure of a component or a bug in a control program from causing dangerous operation. In particular, access control means for protecting shared resources, such as a memory storing programs and data and input-output devices, from unintended access caused by the failure and bug is one of the most important functions. As regards implementation of the access control means, there is known a technique for implementing the protection of a memory region by utilizing an address translation mechanism so as to prevent a processor from falsely accessing an important region on the memory because of a bug or the like in the control program. According to this technique, false access to a memory region which should not be originally accessed is prevented by registering only information of a memory region permitted to access from the program and generating exception processing due to access violation in response to access to other regions in a MMU (Memory Management Unit) incorporated in a processor.

In addition, in a memory access protection apparatus in JP-A-6-75861, an example in which access to a predetermined memory region is controlled by monitoring an address output onto a bus is disclosed.

As for elements of demanded reliability, there are availability and safety. The availability becomes important in control of devices. The safety becomes important in device protection. Implementation means of these two elements are antinomic in many parts.

If an apparatus is configured to be divided into a sub-apparatus in charge of availability and a sub-apparatus in charge of safety, then not only the apparatus becomes complicated but also duplication or complication in running and maintenance work lowers the reliability of human elements in some cases.

For attaining high safety, it is desired to take into consideration not only the case where false access from a control task executed in the processor to shared resources, such as the memory and the input-output devices is caused, but also the case where false access to the memory and other input-output devices is caused by a failure or the like in an input-output device itself, and configure the apparatus so as to be able to prevent them.

The access control utilizing the address translation function of the MMU is effective for false access from the processor caused by a bug or the like in the control program. In the case where data is transferred between the memory and I/O input-output devices without the intervention of the processor, however, the access control utilizing the address translation function of the MMU is not sufficient.

As for a technique of providing an access control information table and preventing access only to a specific address by taking an operation mode and a task as the unit, a hardware resource increase or a performance fall occurs in use in which fine control is exercised for each of several tens input-output devices in a system.

Supposing that ordinary control and safety control aiming at device protection coexist on the same control computer, a control task corresponding to each mode and an input-output device corresponding to it are mixedly present in the same computer system. As a matter of course, it is necessary in this case to change over the access control state for access from the processor to the shared resources, when changeover between an ordinary control mode and a safety control mode is conducted. For a system in which ordinary input-output devices and safety input-output devices are mixedly present, however, false input-output protection with an individual input-output device taken as the unit becomes necessary.

SUMMARY OF THE INVENTION

An object of the present invention is to solve at least one of such problems or requirements.

In order to achieve the object, an input-output control apparatus is configured to store input-output values to be used by a processor to conduct arithmetic operation in a mode having a relatively high safety requirement, in a first storage area, store input-output values to be used by the processor to conduct arithmetic operation in a mode having a relatively low safety requirement, in a second storage area, and restrict copying to the first storage area, copying from the first storage area, copying to the second storage area, or copying from the second storage area according to the mode concerning the safety requirement.

In this way, it becomes possible to prevent input-output devices from conducting false output due to faulty operation.

Other objects, features and advantages of the invention will become apparent from the following description of the embodiments of the invention taken in conjunction with the accompanying drawings.

BRIEF DESCRIPTION OF THE DRAWINGS

FIG. 3 is a table showing an outline of operation.

DESCRIPTION OF THE EMBODIMENTS

Hereafter, embodiments of the present invention will be described with reference to the drawings.

In the ensuing embodiments, two control modes, i.e., an ordinary control mode and a safety control mode are used as control modes that an input-output control apparatus has. In carrying out the present invention, however, it is not necessary to restrict the control modes to the two control modes described above.

For example, as for the safety control, it is also possible to provide several safety levels according to the degree of influence upon the control subject and assign restriction modes respectively to the safety levels.

Furthermore, it is not necessary that the criteria for classifying into the control modes are not always based upon the safety. For example, in the case where a plurality of control operations differing in purpose are conducted, control modes may be assigned to respective purposes.

First Embodiment

Figure 1:
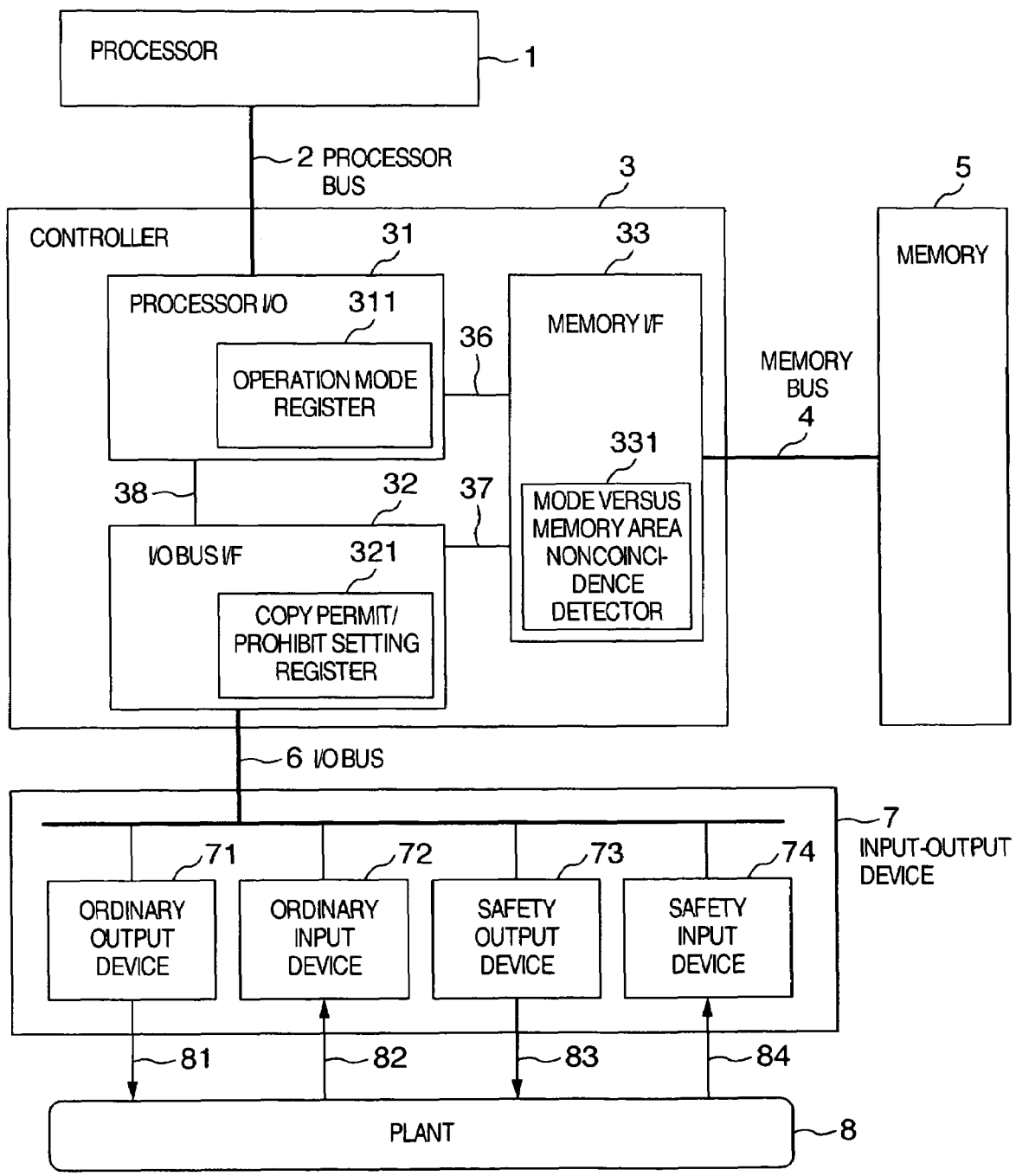
FIG. 1 is a diagram showing a general configuration of an input-output control apparatus according to a first embodiment of the present invention.

FIG. 1 shows a general configuration of an input-output control apparatus according to a first embodiment of the present invention.

A processor 1 conducts arithmetic operation on the basis of input information supplied from input devices 72 and 74 via an I/O bus 6, and executes an application program to give instructions to a plant 8 via the I/O bus 6 and output devices 71 and 73.

A memory 5 retains input-output data.

An input-output device 7 is a device for inputting states 82, 84 from the plant 8 and outputting instructions 81, 83 to the plant 8. The input-output device 7 includes devices of two kinds, i.e., devices 71 and 72 for ordinary control and devices 73 and 74 for safety control.

A controller 3 is present among the processor 1, the memory 5, and the input-output device 7. The controller 3 is connected to the processor 1, the memory 5, and the input-output device 7 respectively via a processor bus 2, a memory bus 4, and an I/O bus 6 to control data input and output. Especially between the input-output device 7 and the memory 5, the controller 3 has a "data copy" function to automatically execute processing of collecting information from the input devices 72 and 74 and transferring memory information to the output devices 71 and 73, periodically in accordance with initial setting information.

A processor I/F 31, a memory I/F 33 and an input-output bus I/F 32 in the controller 3 are coupled to each other by controller internal signals 36, 37 and 38. The processor I/F 31 receives access from the processor 1, and couples the access to the memory I/F 33.

In the same way, the input-output bus I/F 32 has a function of periodically conducting data copy between the memory 5 and the input-output device 7 in accordance with initial setting without intervention of a program. (Also when the processor directly accesses the input-output device, the access is conducted via the input-output bus I/F 32.)

By the way, the memory I/F 33 exercises read-write control on the memory 5, and conducts mode versus memory area noncoincidence detection 331.

Basic operation will now be described.

The processor 1 conducts initial setting on the controller 3.

In response to initial setting instructions, data copy parameters given by the processor 1 are set by a microprogram or an application program.

After an application program is started, an operating system (OS) sets an operation mode (safety or ordinary) in an operation mode register 311, and then executes the application program and conducts input-output processing.

At this time, the application program is prevented from conducting false input to and output from the input-output device 7 which becomes an access prohibition subject.

Hereafter, a detailed embodiment will be described with reference to FIG. 2.

Figure 2:
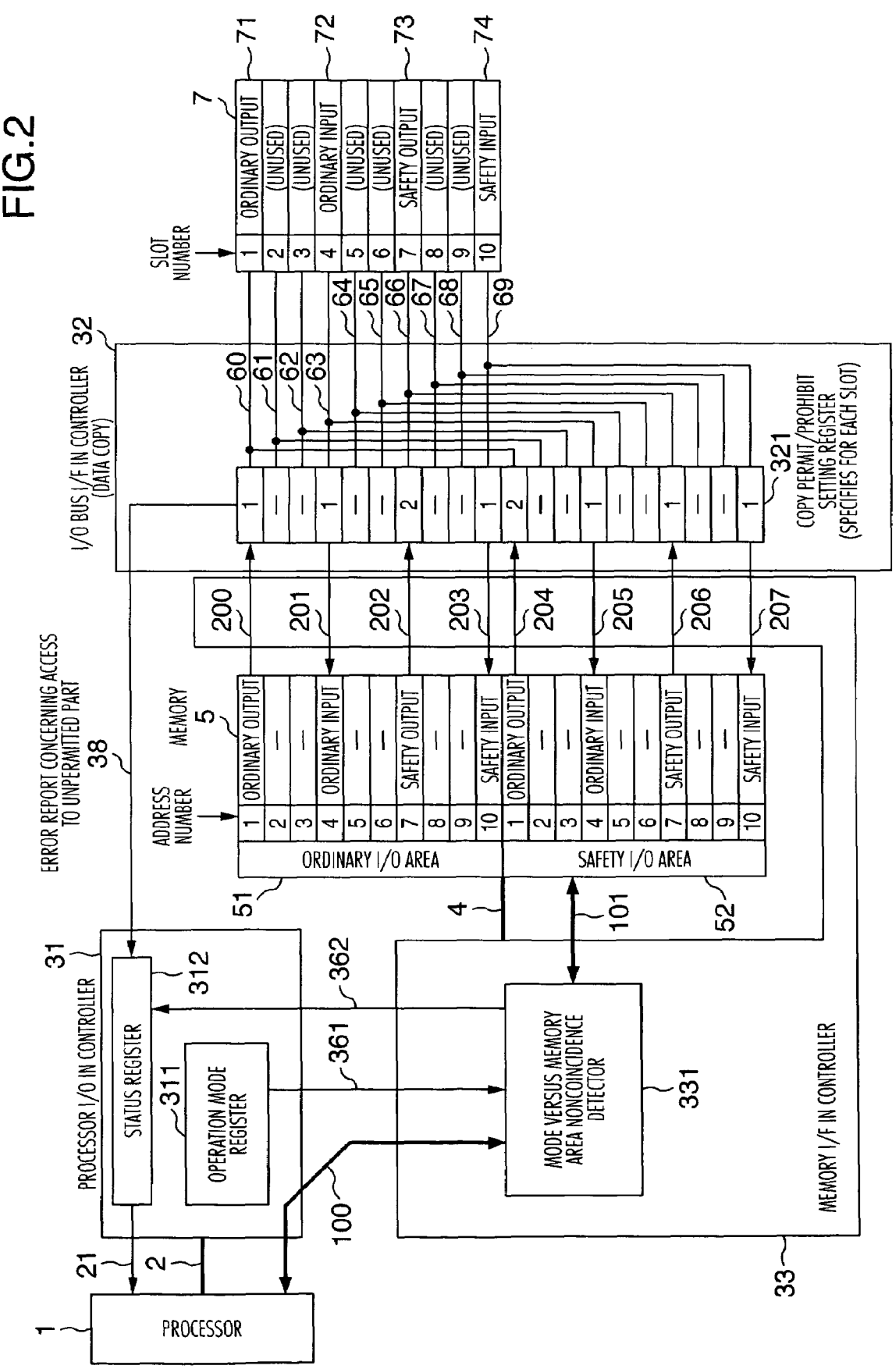
FIG. 2 is a diagram showing a detailed configuration around a memory.

FIG. 2 shows the general configuration in FIG. 1 around the memory in more detail.

The processor 1 conducts initial setting on a copy permit/prohibit setting register 321 in the controller in accordance with system configuration information previously registered.

Whether to permit data transmission to or reception from the input-output device 7 with a slot taken as the unit is set in the copy permit/prohibit setting register 321. Thereafter, a data copy period is set, and a copy start instruction is issued.

As for contents in the copy permit/prohibit setting register 321, "1" indicates that copy should be conducted, whereas "2" indicates that copy should not be conducted. For example, "1" is set in a cell in the copy permit/prohibit setting register 321 corresponding to an output destination of an address number 1 (ordinary output) in an ordinary I/O area 51. If data is written in the address number 1 (ordinary output) in the ordinary I/O area 51, the written data is copied into a slot number 1 (71) (ordinary output) in the input-output device 7 by the copy permit/prohibit setting register 321. In the same way, for example, "2" is set in a cell in the copy permit/prohibit setting register 321 corresponding to an output destination of an address number 7 (safety output) in the ordinary I/O area 51. Even if data is written in the address number 7 (safety output) in the ordinary I/O area 51, the written data is not copied into a slot number 7 (73) (safety output) in the input-output device 7 by the copy permit/prohibit setting register 321.

A cell in the copy permit/prohibit setting register 321 that couples a slot number 4 (72) (ordinary input) in the input-output device 7 to an output destination of an address number 4 (ordinary input) in a safety I/O area 52 has "1" set therein. A cell in the copy permit/prohibit setting register 321 that couples a slot number 10 (74) (safety input) in the input-output device 7 to an output destination of an address number 10 (safety input) in the ordinary I/O area 51 has "1" set therein. However, "2" can be set in these cells by the initial setting. In other words, the copy permit/prohibit setting register 321 can be set by the initial setting so as to prevent data written into the slot number 4 (72) (ordinary input) in the input-output device 7 from being copied to the address number 4 (ordinary input) in the safety I/O area 52 and prevent data written into the slot number 10 (74) (safety input) in the input-output device 7 from being copied to the address number 10 (safety input) in the ordinary I/O area 51.

Upon receiving the copy start instruction, the input-output bus I/F 32 automatically conducts data transmission and reception between the memory 5 and the input-output device 7 at the set data copy periods.

The memory 5 has two planes, i.e., the ordinary I/O area 51 and the safety I/O area 52. The memory 5 has input-output areas of two planes for one input-output device. As for data output, output is conducted from a corresponding area in accordance with the operation mode register 311. For the ordinary output device 71, output is conducted from the ordinary I/O area 51. For the safety output device 73, output is conducted from the safety I/O area 52.

At the time of operation of the application program, the OS sets an operation mode, i.e., the ordinary control mode or the safety control mode in the operation mode register 311, and then executes the application program. The application program conducts input-output processing 100.

The application program refers to input data present in the memory 5, and executes control arithmetic operation. Furthermore, the application program writes output data obtained by the control arithmetic operation into a data output area on the memory 5 (100, 101).

The data written into the output area is transmitted to the output device and output to the plant by data copy 60 to 69. Furthermore, data input from the plant is conducted.

The mode versus memory area noncoincidence detector 331 restricts the input and output ranges in accordance with contents 361 set in the operation mode register 311. Only access 101 permitted in the mode versus memory area noncoincidence detector 331 can access the memory 5.

As for outputs, only an ordinary output 200 is permitted at the time of the ordinary control mode and only a safety output is permitted at the time of the safety control mode, in the example shown in FIG. 2. A safety output 202 in the ordinary mode and an ordinary output 204 in the safety mode are not permitted.

Even if an output instruction 202 (memory write) for safety output in the ordinary I/O area 51 is given when operation is being conducted in the ordinary mode, therefore, data copy 66 to the safety output device 73 is not conducted.

At this time, an area is checked to determine whether an output is issued to an area to which output is not permitted, besides the data copy period. When writing into an address in the memory to which output is not permitted is detected, an error report 38 is conducted (and reflected into an error interrupt 21 and a status register 312).

If an access instruction to an unpermitted part, such as an output instruction 204 or 206 (memory write) to the safety I/O area 52 when operation is being conducted in the ordinary mode, then the mode versus memory area noncoincidence detector 331 compares the current operation mode with an access address. When the output instruction 206 (memory write) to the safety I/O area is issued, an error report 362 is conducted (and reflected into the error interrupt 21 and the status register 312).

As a result, false output conducted by the application program is prevented and detected.

In this example, it is made always possible to write (201, 205, 203 and 207) input data in areas (two places) of both modes in the memory.

This is a disposal for preventing reception of illegal input data and false arithmetic operation even in false access such as reading 203 data stored in the safety input device 74 from the ordinary I/O area 51. In this case as well, the error report 362 for access to an unpermitted part is conducted (and reflected into the error interrupt 21 and the status register 312).

The operation outline heretofore described is shown in FIG. 3 in a table form.

When the processor 1 conducts arithmetic operation in the ordinary mode, ordinary input and ordinary output become available.

If safety input or safety output is conducted in the ordinary mode, therefore, the error report 38 is conducted as abnormal operation.

In the same way, when the processor 1 conducts arithmetic operation in the safety mode, only safety input and safety output become available.

If ordinary input or ordinary output is conducted in the safety mode, therefore, the error report 38 is conducted as abnormal operation.

The operation will now be described in more detail. With reference to FIG. 3, for example, in the ordinary mode, the processor 1 can write into the address number 1 (ordinary output) in the ordinary I/O area 51. In this case, the written data can be outputted. In the same way, in the ordinary mode, the processor 1 can read data written into an address number 4 (ordinary input) in the ordinary I/O area 51. In this case, the written data is read by the processor 1.

With reference to FIG. 3, safety input in the ordinary I/O area 51 at the time when the operation mode is the ordinary mode is described as "3" (reading or alarm report [38] is possible according to setting). This indicates that reading or alarm report [38] can be set by initial setting.

In other words, if the cell in the copy permit/prohibit setting register 321 that couples the slot number 10 (74) (safety input) in the input-output device 7 to the output destination of the address number 10 (safety input) in the ordinary I/O area 51 has "1" set therein as shown in FIG. 2, then "1 (read input value)" is set. On the other hand, if the cell in the copy permit/prohibit setting register 321 that couples the slot number 10 (74) (safety input) in the input-output device 7 to the output destination of the address number 10 (safety input) in the ordinary I/O area 51 has "2" set therein, then "2 (output is impossible, alarm report [38])" is set.

In the same way, ordinary input in the safety I/O area 52 at the time when the operation mode is the safety mode is described as "3" (reading or alarm report [38] is possible according to presetting). This indicates that reading or alarm report [38] can be set by initial setting.

In the example shown in FIG. 2, it is made possible to read normal data value even if the processor 1 falsely conducts safety input in the ordinary mode or ordinary input in the safety mode.

This is a disposal for preventing false arithmetic operation caused by returning false data, because some time period is required until the interrupt 21 is caused by the error report 38 and the processor 1 continues to operate during that time period.

By defining "3" as a new restriction mode, it becomes possible to return data and turn on the error report 38 in response to access.

By the way, as a way of use improved in availability, it is also possible to report the alarm 362 as abnormality in the mode versus memory area noncoincidence detector 331 only at the time of the ordinary mode and make both the ordinary I/O area 51 and the safety I/O area 52 accessible at the time of the safety mode.

The memory areas 51 and 52 can be separated from each other by using the present scheme. As a result, reliable protection using a simple configuration becomes possible.

Legality of the system can be secured by judging the operation to be normal only when the operation mode declared by software coincides with the access address.

Second Example

In the first example, it is also possible to instruct the control mode in the OS and replace the decision making place in the mode versus memory area noncoincidence detector 331 in the processor IF 31 by changing MMU information in conformity with the control mode using the MMU function of the processor, changing over write prohibit/cancel, and conduct access protection to the safety I/O area.

Third Embodiment

A similar function is implemented by providing one plane as the physical memory and automatically adding an offset corresponding to a mapping change in hardware in accordance with the operation mode register in the controller.

Fourth Embodiment

In the initial setting conducted on the copy permit/prohibit setting register 321 by the processor 1, setting is conducted in accordance with previously registered system configuration information. Alternatively, it is also possible at the time of system initialization immediately after power turning on to read information of the actually connected input-output devices and conduct setting according to the mounted slots and device kinds automatically.

In the embodiments, it is possible to restrict access to inputs/outputs of respective input-output devices from the program by providing input-output areas in multiple in the input-output devices, causing each of the input-output areas to be dedicated when the software operates in the safety mode or operates in the ordinary mode, and setting input-output executable levels for the process input-output devices at the time of initialization.

As a result, input-output protection according to each program operation mode becomes possible, and it becomes possible to prevent input-output devices from conducting false output due to faulty operation of the program.

Furthermore, as a result, it becomes possible for the programmer to access the safety input-output data by only changing the offset of the address used to conduct the input-output. The program can also be changed easily.

By the way, the embodiments have been described supposing the copy scheme which is more difficult to implement than direct access to the input-output devices from the processor. Even in the direct access scheme, similar protection is possible by using the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An input-output control apparatus comprising:
a storage area including a first storage area and a second storage area for storing information to be transmitted from an input-output device to a processor and storing information operated on by said processor based on the information received by said processor and to be transmitted from said processor to said input-output device, wherein
said first storage area including plural partial regions which are adapted to store input-output values to be used by a processor to conduct an arithmetic operation in a mode having a relatively high safety requirement, said second storage area including plural partial regions which are adapted to store input-output values to be used by the processor to conduct an arithmetic operation in a mode having a relatively low safety requirement,
wherein each of plural regions of said input-output device corresponding to any one of the partial regions of said first storage area and any one of the partial regions of said second storage area, and
wherein data transmission from a predetermined region of said input-output device to a corresponding partial region of said first storage area, from a predetermined partial region of said first storage area to a corresponding region of said input-output device, from a predetermined region of said input-output device to a corresponding partial region of said second storage are, or from a predetermined partial region of said second storage area to a corresponding region of said input-output device, is restricted according to the mode concerning the safety requirement.

2. An input-output control apparatus according to claim 1, wherein said plural regions of said input-output device having an ordinary output region, an ordinary input region, a safety output region, and a safety input region,
each partial region of said first and second storage corresponding to a region of said ordinary output region, said ordinary input region, said safety output region, or said safety input region, and
an output from a predetermined partial region of said first storage area to said input-output device is restricted, and an output from a predetermined region to said input-output device to said second storage area is restricted.

3. An input-output control apparatus according to claim 1, comprising a transmission permit/prohibit setting register,
wherein the restriction on the transmission is conducted by referring to contents of the transmission permit/prohibit setting register.

4. An input-output control apparatus according to claim 3, comprising a status register,
wherein the mode concerning the safety requirement is determined by referring to contents of the status register.

5. An input-output control apparatus according to claim 4, wherein
data of said first storage area and said second storage area are copied to slots, and
said first storage area is associated with said second storage area on a shot basis so that data of said first storage area and the second storage area are copied to a corresponding slot.

6. An input-output control apparatus according to claim 5, wherein said first storage area and said second storage area have similar address configurations with an offset.

7. An input-output control apparatus according to claim 6, wherein said first storage area and said second storage area are formed in one physical memory.

8. An input-output control apparatus according to claim 1, comprising:
access regions in said first storage area and said second storage area being restricted according to the mode concerning the safety requirement, and
means for conducting an abnormality report when illegal access is attempted against the restriction.

9. An input-output control apparatus according to claim 1, wherein the restriction is set according to system configuration information in software, at a time of system initialization.

10. An input-output control apparatus according to claim 1, wherein the restriction is set according to input-output device mounting information in hardware, at a time of system initialization.

11. A plant control apparatus including a processor for conducting an arithmetic operation on plant control information on a basis of plant information, and an input-output unit for conducting input to and output from the processor,
wherein the input-output unit comprises:
a storage area including a first storage area and a second storage area for storing information to be transmitted from an input-output unit to a processor and storing information operated on by said processor based on the information received by said processor and to be transmitted from said processor to said input-output unit, wherein
said first storage area including plural partial regions for storing input-output values to be used by the processor to conduct an arithmetic operation in a mode having a relatively high safety requirement, wherein each of the plural regions of said input-output unit corresponds to any one of the plural partial regions of said first storage area;
said second storage area including plural partial regions for storing input-output values to be used by the processor to conduct an arithmetic operation in a mode having a relatively low safety requirement, wherein each of the plural regions of said input-output unit corresponds to any one of the plural partial regions of said second storage area; and
a restriction unit for restricting transmission from a predetermined region of said input-output unit to a corresponding partial region of said first storage area, transmission from a predetermined partial region of said first storage area to a corresponding region of said input-output unit, transmission from a predetermined region of said input-output unit to a corresponding partial region of said second storage area, or transmission from a predetermined partial region of said second storage area to a corresponding region of said input-output unit, according to the mode concerning the safety requirement.

12. An input-output control method comprising:

storing input-output values to be used by a processor to conduct an arithmetic operation in a mode having a relatively high safety requirement, in plural partial regions of a first storage area, wherein each of plural regions of an input-output unit corresponds to any one of the plural partial regions of said first storage area;

storing input-output values to be used by the processor to conduct arithmetic operation in a mode having a relatively low safety requirement, in plural partial regions of a second storage area, wherein each of plural regions of said input-output unit corresponds to any one of the plural regions of said second storage area; and restricting transmission from a predetermined region of said input-output unit to a corrsponding partial region of said first storage area, transmission from a predetermined partial region of said first storage area to a corresponding region of said input-output unit, transmission from a predetermined region of said input-output unit to a corresponding partial region of said second storage area, or transmission from a predetermined partial region of said second storage area to a corresponding region of said input-output unit, according to the mode concerning the safety requirement.

13. A plant control method relating to control information of a plant transmitted via an input-output unit, said plant control method comprising:

storing input-output values to be used by a processor to conduct arithmetic operation in a mode having a relatively high safety requirement, in plural partial regions of a first storage area, wherein each of plural regions of said input-output unit corresponds to any one of the plural partial regions of said first storage area;

storing input-output values to be used by the processor to conduct arithmetic operation in a mode having a relatively low safety requirement, in plural partial regions of a second storage area, wherein each of plural regions of said input-output unit corresponds to any one of the plural partial regions of said second storage area; and restricting transmission from a predetermined region of said input-output unit to a corresponding partial region of said first storage area, transmission from a predetermined partial region of said first storage area to a corresponding region of said input-output unit, transmission from a predetermined region of said input-output unit to a corresponding partial region of said second storage area to a corresponding region of said input-output unit, or transmission from a predetermined partial region of said second storage area to a corresponding region of said input-output unit, according to the mode concerning the safety requirement.

* * * * *